United States Patent
Bass et al.

(10) Patent No.: US 6,557,053 B1
(45) Date of Patent: Apr. 29, 2003

(54) QUEUE MANAGER FOR A BUFFER

(75) Inventors: Brian Mitchell Bass, Apex, NC (US); Jean Louis Calvignac, Cary, NC (US); Marco C. Heddes, Raleigh, NC (US); Michael Steven Siegel, Raleigh, NC (US); Michael Raymond Trombley, Cary, NC (US); Fabrice Jean Verplanken, La Gaude (FR)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/477,179

(22) Filed: Jan. 4, 2000

(51) Int. Cl.[7] .............................................. G06F 13/14
(52) U.S. Cl. ........................ 710/29; 710/57; 710/102; 365/230.08
(58) Field of Search .............................. 710/29, 52, 57, 710/102; 365/230.08

(56) References Cited

U.S. PATENT DOCUMENTS

| | | | |
|---|---|---|---|
| 4,884,237 A | * 11/1989 | Muller et al. ................... 365/63 |
| 5,043,981 A | 8/1991 | Firoozmand et al. ........ 370/85.1 |
| 5,519,701 A | 5/1996 | Colmant et al. ............. 370/60.1 |
| 5,524,265 A | 6/1996 | Balmer et al. ................ 395/800 |
| 5,604,742 A | 2/1997 | Colmant et al. ............. 370/396 |
| 5,781,182 A | 7/1998 | Liu et al. ..................... 345/196 |
| 5,892,979 A | * 4/1999 | Shiraki et al. ................. 710/52 |
| 5,946,000 A | 8/1999 | Hoel ............................ 345/442 |
| 6,031,785 A | * 2/2000 | Park et al. .............. 365/230.08 |
| 6,044,419 A | * 3/2000 | Hayek et al. ................... 710/57 |
| 6,058,439 A | * 5/2000 | Devereux ...................... 710/52 |
| 6,295,563 B1 | * 9/2001 | Whittaker ...................... 710/52 |
| 6,314,478 B1 | * 11/2001 | Etchevrry ..................... 710/29 |

OTHER PUBLICATIONS

"The SP2 High–Performance Switch" by Stunkel et al, IBM Systems Journal, vol. 34, No. 2, 1995, pp. 185–204.

* cited by examiner

Primary Examiner—Jeffrey Gaffin
Assistant Examiner—Abdelmoniem Elamin
(74) Attorney, Agent, or Firm—Driggs, Lucas, Brubaker & Hogg; William N. Hogg

(57) ABSTRACT

A bandwidth conserving queue manager for a FIFO buffer is provided, preferably on an ASIC chip and preferably including separate DRAM storage that maintains a FIFO queue which can extend beyond the data storage space of the FIFO buffer to provide additional data storage space as needed. FIFO buffers are used on the ASIC chip to store and retrieve multiple queue entries. As long as the total size of the queue does not exceed the storage available in the buffers, no additional data storage is needed. However, when some predetermined amount of the buffer storage space in the FIFO buffers is exceeded, data are written to and read from the additional data storage, and preferably in packets which are of optimum size for maintaining peak performance of the data storage device and which are written to the data storage device in such a way that they are queued in a first-in, first-out (FIFO) sequence of addresses. Preferably, the data are written to and are read from the DRAM in burst mode.

12 Claims, 2 Drawing Sheets

QUEUE MANAGER FOR A BUFFER

FIELD OF THE INVENTION

This invention relates generally to management of queues of data being received from an outside source and inputted into a device for further processing. In more particular aspects, this invention relates to an improved DRAM used in conjunction with a FIFO buffer for controlling the queue of received data.

BACKGROUND OF THE INVENTION

There are many applications in which data is received at a higher rate than it can be utilized by a particular device for short periods of time, thus necessitating queuing data for orderly input into the device on which it is to be used. A common type of queue is first-in, first-out (FIFO) buffers which temporarily store the data being received from some outside source for input into the receiving device at a rate the receiving device can accommodate. One of the problems encountered is that the FIFO buffers may exceed their capacity to store data inputted faster than it can be outputted. Thus, there is a need for a technique for managing data in an orderly way with minimum overhead for periods of time when such data being inputted is greater than the storage capacity of the FIFO buffer or buffers.

SUMMARY OF THE INVENTION

According to the present invention, a bandwidth conserving queue manager for a FIFO buffer is provided, preferably on an ASIC chip and preferably including a separate DRAM that maintains a FIFO queue which can extend beyond the data storage space of the FIFO buffer to provide additional data storage space as needed. FIFO buffers are used on the ASIC chip to store and retrieve multiple queue entries. As long as the total size of the queue does not exceed the storage available in the buffers, no additional data storage is needed. However, when the buffer storage space in the FIFO buffers is exceeded, data are written to and read from the additional data storage preferably a DRAM and preferably in packets which are of optimum size for maintaining peak performance of the data storage device and which are written to the data storage device in such a way that they are queued in a first-in, first-out (FIFO) sequence of addresses. The DRAM can be a separate chip, or it can be formed on the ASIC. In either case, its memory is separate from the FIFO buffer or buffers.

DESCRIPTION OF THE PREFERRED EMBODIMENT

Figure 1:
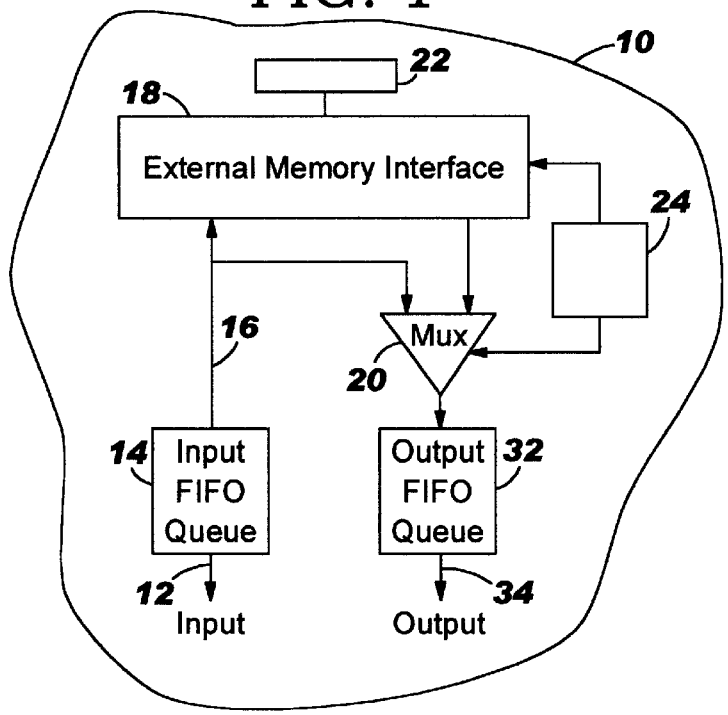
FIG. 1 is a high level diagrammatic view of the structure of the managed DRAM queue manager of the present invention.

Referring now to the drawings and, for the present, to FIG. 1, an overview of the structure and operation of the bandwidth conserving DRAM queue manager according to the present invention is shown. The queue manager is formed on an ASIC chip 10. The queue manager receives data input 12 from an outside source which is inputted to an input FIFO (first-in, first-out) buffer 14 in which the data is arranged in a queue. Data 16 is outputted from the input FIFO buffer 14 to a memory interface 18 and to a multiplexor (Mux) 20. The memory interface 18 connects to a DRAM chip 22 which is a separate chip. (However, the DRAM could be formed on the ASIC 10.) The multiplexor 20 is controlled by multiplexor control logic 24 to output data 16 from FIFO buffer 14 selectively to the DRAM chip 22 or to an output FIFO buffer 32. The FIFO buffer 32 outputs data 34 to the device (not shown) to which data is being supplied.

In general, the queue manager shown in FIG. 1 operates in the following manner: Data 12 to be written into the queue is inputted to the input FIFO buffer 14. Data 16 leaving the FIFO may go either to the output FIFO 32 or to the external memory interface 18 and then to the DRAM chip 22 as controlled by the mux 20 and by mux control logic 24 depending on whether or not there is enough room in the input FIFO buffer 14 and the output FIFO buffer 32 for the data being read from an external source. The mux 20 is controlled based on this condition, i.e., whether the input FIFO buffer 14 and output FIFO buffer 32 are full or at least have a predetermined percentage of capacity filled. When there is more data to be stored in the input FIFO buffer 14 and output FIFO buffer 32 than the maximum permitted, the mux 20 selects data to be written to the external memory interface 18 and the data is then stored in the DRAM chip 22. As the output FIFO buffer 32 is read out, the data is read from the DRAM chip 22 through the memory interface, to the output FIFO buffer 32 under the control of the mux control logic 24. Thus, as long as the amount of input data 12 being read from an external source does not exceed a preselected capacity of the input FIFO buffer 14 and output FIFO buffer 32, the data is passed from the input FIFO buffer 14 directly to the output FIFO buffer 32.

However, when the amount of data 12 being inputted exceeds the capacity or predetermined percentage of capacity of the input FIFO buffer 14 and the output FIFO buffer 32, then the data is written by the input FIFO buffer 14 to the DRAM chip 22 through the memory interface 18. The DRAM chip 22 is structured to be written and read on a first-in, first-out basis at contiguous addresses so that address mapping is not required as in a conventional cache memory. The data is written to the input FIFO buffer 14 from the external source and to the output FIFO buffer 32 from the input FIFO buffer 14 one data item at a time. However, preferably the data is written to the memory interface 18 and thence to the DRAM chip 22, and read from the DRAM chip 22 by output FIFO 32 in bursts of multiple data items to utilize the optimum transfer rate of the DRAM chip 22. Moreover, because the DRAM is arranged so that it is ordered on a first-in, first-out basis, the burst capabilities can be used and no address tags need be applied to the data written thereto. Thus, for example, the data can be written to and read from the DRAM chip 22 in data packets of three items, rather than have to read each data item individually by address. It is also preferred that the DRAM be a DDR (double data rate) DRAM. Double data rate DRAM allows twice the data bandwidth for a given number of I/O pins on the ASIC package as does standard synchronous DRAM This is accomplished by launching and capturing data on both the rising and falling edge of the clock signal. RAMBUS is another scheme of increasing the bandwidth per in which may be beneficial in some applications.

Figure 2:
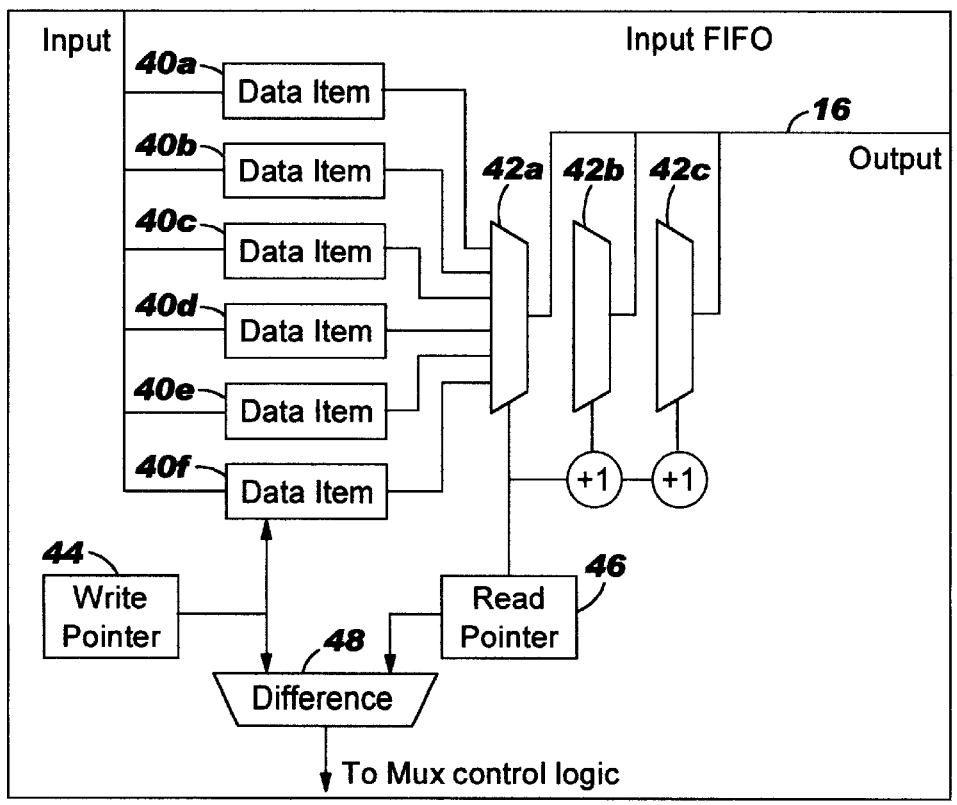
FIG. 2 is a detailed view, somewhat diagrammatic, of the input FIFO buffer.

Referring now to FIG. 2, a more detailed depiction of the input FIFO buffer 14 is shown. The input FIFO buffer 14 includes latches at storage locations 40a, 40b, 40c, 40d, 40e and 40f for six different data items. The data items are read one data item at a time from an external source and are written in the FIFO buffer 14, one data item at a time, under control selectors 42a, 42b and 42c. A write pointer 44 and read pointer 46 are both provided which provide outputs to a comparator 48. The output of the comparator 48 goes to the mux control logic 24. As indicated above, the data is written in bursts, e.g. three data items from the FIFO buffer 14 to the DRAM 20 or one data item at a time to the output FIFO buffer 32 responsive to the control of the mux 20. A detailed view of the output FIFO buffer 32 is shown in FIG. 3.

Figure 3:
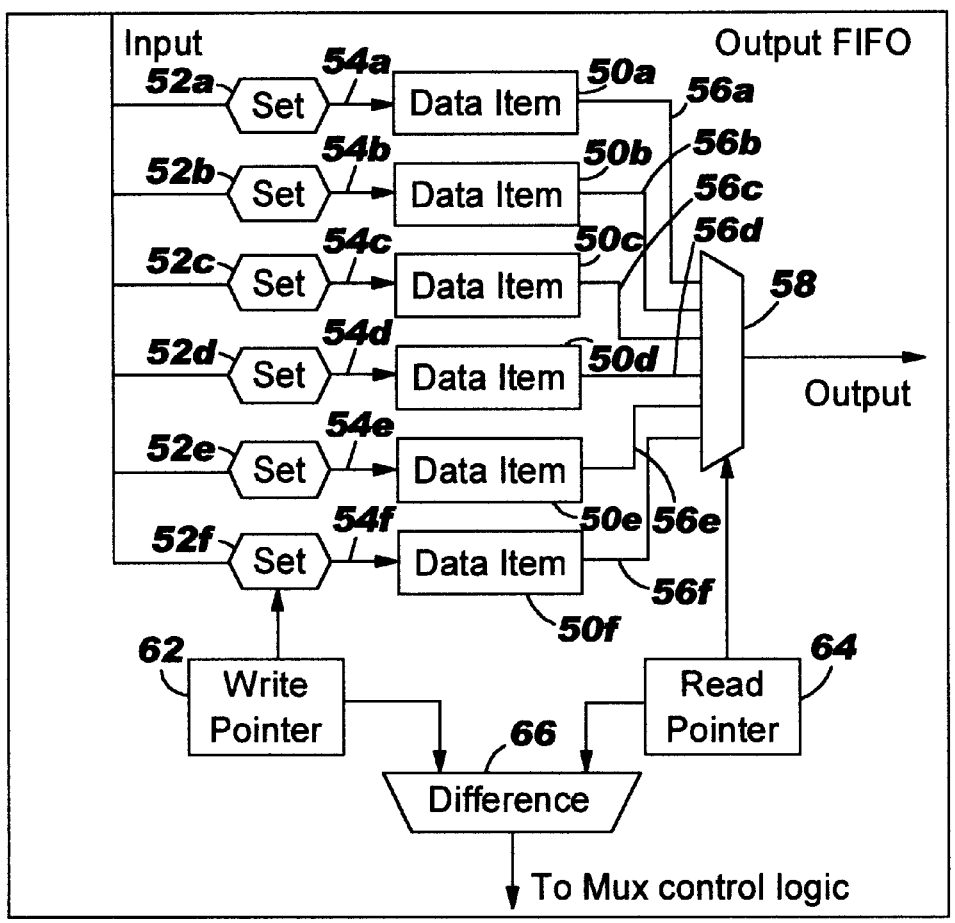
FIG. 3 is a detailed view, somewhat diagrammatic, of the output FIFO buffer.

Shown in FIG. 3 are data item latches at storage locations 50a, 50b, 50c, 50d, 50e and 50f and selectors 52a, 52b, 52c, 52d, 52e and 52f which control the inputs 54a, 54b, 54c, 54d, 54e and 54f to storage locations 50a–50f. Data outputs 56a, 56b, 56c, 56d, 56e and 56f from the data item storage 50a–50f are provided which go to a selector 58 to provide the data output 34, the data being outputted one data item at a time. A write pointer 62 and a read pointer 64 are provided which output signals to a comparator 66. Comparator 66 outputs its difference to the mux control logic 24.

Also, the DRAM 20 has a write pointer, a read pointer and a comparator (all not shown), the output of which DRAM comparator is also provided to the mux control logic 24 As indicated above, the data is written to the output FIFO 32 from the DRAM in multiple data items to utilize the optimum data rate transfer of the DRAM. The memory interface is responsible for maintaining pointers to the head and tail portions of the queue which is stored in the DRAM chip 22. By having contiguous addresses and head and tail pointers, the need for individual addresses is eliminated, and the DRAM chip 22 acts in a FIFO mode.

The multiplexor 20 is controlled by the multiplexor control logic 24 in the following way: Initially, data 12 is inputted to the input FIFO queue in the FIFO buffer 14 one data item at a time, and, assuming the output FIFO buffer 32 is empty, the data is passed from the input FIFO buffer 14 directly to the output FIFO buffer 32 by the action of the mux 20. When the output FIFO buffer 32 is completely full and the input FIFO buffer 14 is half full, the mux 20 is switched by the control logic 24 responsive to the comparators 48 and 66 to pass data through the memory interface 18 to the DRAM chip 22 on the write cycle in multiple data items and for the output FIFO 32 to read data from the DRAM chip 22 through the memory interface 18 on the read cycle in multiple data items. When the comparator in the DRAM indicates that there are no more data items stored in the DRAM chip 22, the mux 20 is switched back to pass the data from the input FIFO buffer 14 to the output FIFO buffer 32.

The control of the memory interface, as indicated above, is accomplished by a write pointer to keep track of where the next group of data items will be written and a read pointer to keep track of from where the next group of data items will be read. The comparator determines if these two pointers are the same, which indicates the buffer is either full or empty. The read and write pointers work in the following way: When the read and write pointers are at the same data location on a read cycle, it means the storage locations are empty, and when the read and write pointers are at the same location on a write cycle, it means that the storage locations are full.

Thus, the read and write pointers and comparators 44, 46 and 48 and read and write pointers and comparators 62, 64 and 66, operate to indicate whether the data storage in the input FIFO buffer 14 is full or empty and the data storage in output FIFO buffer 32 is full or empty and to control the operation of the mux 20 accordingly. The read and write and comparator in the DRAM operate in the same way. (It should be noted that in some applications a linked list of data items can be used rather than read and write pointers).

The bus width of the interfaces to the input data 12 and output data 34 can be the same as the bus width at the memory bus interface. However, different bus widths may be desirable, especially if a DDR DRAM is used. The trade-off which must be made based on the particular application is the amount of on-chip buffering which will be provided (silicon area) versus the efficiency of the data transfer (bandwidth). In most cases, the bandwidth is more important. The maximum bandwidth is determined by the width of the DRAM interface and the rate at which it can accept commands and data. These rates are a property of the DRAM and the width is selectable, although the number of I/Os on an ASIC is usually a limiting factor. When these issues are weighed, there will be a particular minimum packet size required to maintain this maximum bandwidth. The input data 12 and output data 34 widths will usually be dictated by the particular application so the variable is on the on-chip buffer size which would be the minimum DRAM packet size divided by the data item size times four. (The input and output FIFOs each need to be able to store two memory packets worth of data.)

To summarize the operation of the device of this invention, data is read into the input FIFO buffer 14 from an outside source and is written from the input FIFO buffer 14 to the output FIFO buffer 32 as long as the output FIFO buffer 32 is not full. When the output FIFO buffer 32 becomes full and the input FIFO buffer 14 becomes half full, the mux 20 shifts and allows the input FIFO buffer 14 to write data to the DRAM chip 22 and allows the output FIFO buffer 32 to read data from the DRAM chip 22. The output from the output FIFO buffer 32 is outputted as output 34. When the output FIFO buffer 32 and the DRAM chip 22 are empty, the mux 20 then allows the input FIFO buffer 14 to write directly to the output FIFO buffer 32. Thus, the DRAM chip 22 acts as an additional buffer space when the data input 12 is greater than input FIFO buffer 14 and output FIFO buffer 32 can handle.

What is claimed is:

1. A queue manager for managing data input to a system from an outside source, comprising:

an input FIFO buffer for receiving and storing data items from said outside source;

an output FIFO buffer for receiving, storing and outputting data items to said system;

a memory storage device interfacing with said input FIFO buffer, and said output FIFO buffer, and a control mechanism to selectively write data from said input FIFO buffer to said memory storage device, and read data from said memory storage device to said output FIFO buffer;

wherein said control mechanism includes logic to connect said input FIFO buffer to said output FIFO buffer until said output FIFO buffer is filled to a first predetermined amount and said input FIFO buffer is filled to a second predetermined amount, and thereafter connect said input FIFO buffer to said memory storage device until said memory storage device is empty and said output FIFO buffer is empty, and then connect said input FIFO buffer to said output FIFO buffer.

2. The invention as defined in claim 1 wherein said data is stored in said input FIFO buffer and said output FIFO buffer as data items, and said control circuit includes circuit logic to write data to said output data buffer and read data from said input FIFO buffer in multiple packets of data items.

3. The invention as defined in claim 2 wherein said memory storage device is configured to read and write data in burst mode.

4. The invention as defined in claim 1 wherein said memory storage device includes at least one DRAM chip.

5. The invention as defined in claim 1 wherein first predetermined amount is completely fill and second predetermined amount is one-half full.

6. The inventions defined in claim 1 wherein said control mechanism includes a multiplexor.

7. The invention as defined in claim 4 wherein said DRAM chip is a double density DRAM chip.

8. A method for managing data input to a system from an outside source, comprising the steps of:

provising an input FIFO buffer for receiving and storing data items from said outside source;

providing an output FIFO buffer for receiving, storing and outputting data items to said system;

providing a memory storage device interfacing with said input FIFO buffer, and said output FIFO buffer;

providing input data to said input FIFO buffer and output data from said output FIFO buffer, and controlling the data flow so as to connect said input FIFO buffer to said output FIFO buffer until said output FIFO buffer is filled to a first predetermined amount and said input FIFO buffer is filled to a second predetermined amount, and thereafter connecting said input FIFO buffer to said memory storage device and said output FIFO buffer to said memory storage device until said memory storage device is empty and said output FIFO buffer is empty, and then connecting said input FIFO buffer to said output FIFO buffer.

9. The invention as defined in claim 8 wherein said data is written to said input FIFO buffer and said output FIFO buffer as data items, and data is written to said output data buffer and read data from said input FIFO buffer in multiple packets of data items.

10. The invention as defined in claim 8 wherein data is written to and read from said memory storage device in burst mode.

11. The invention as defined in claim 8 wherein said memory storage device includes at least one DRAM chip.

12. The invention as defined in claim 8 wherein said first predetermined amount is completely full and said second predetermined amount is one-half full.

* * * * *